Feb. 27, 1968 C. N. DAVEY 3,371,274
BEAM SCANNER FOR INDICATING THE POSITION OF A BEAM
OF NUCLEAR PARTICLES
Filed July 10, 1964
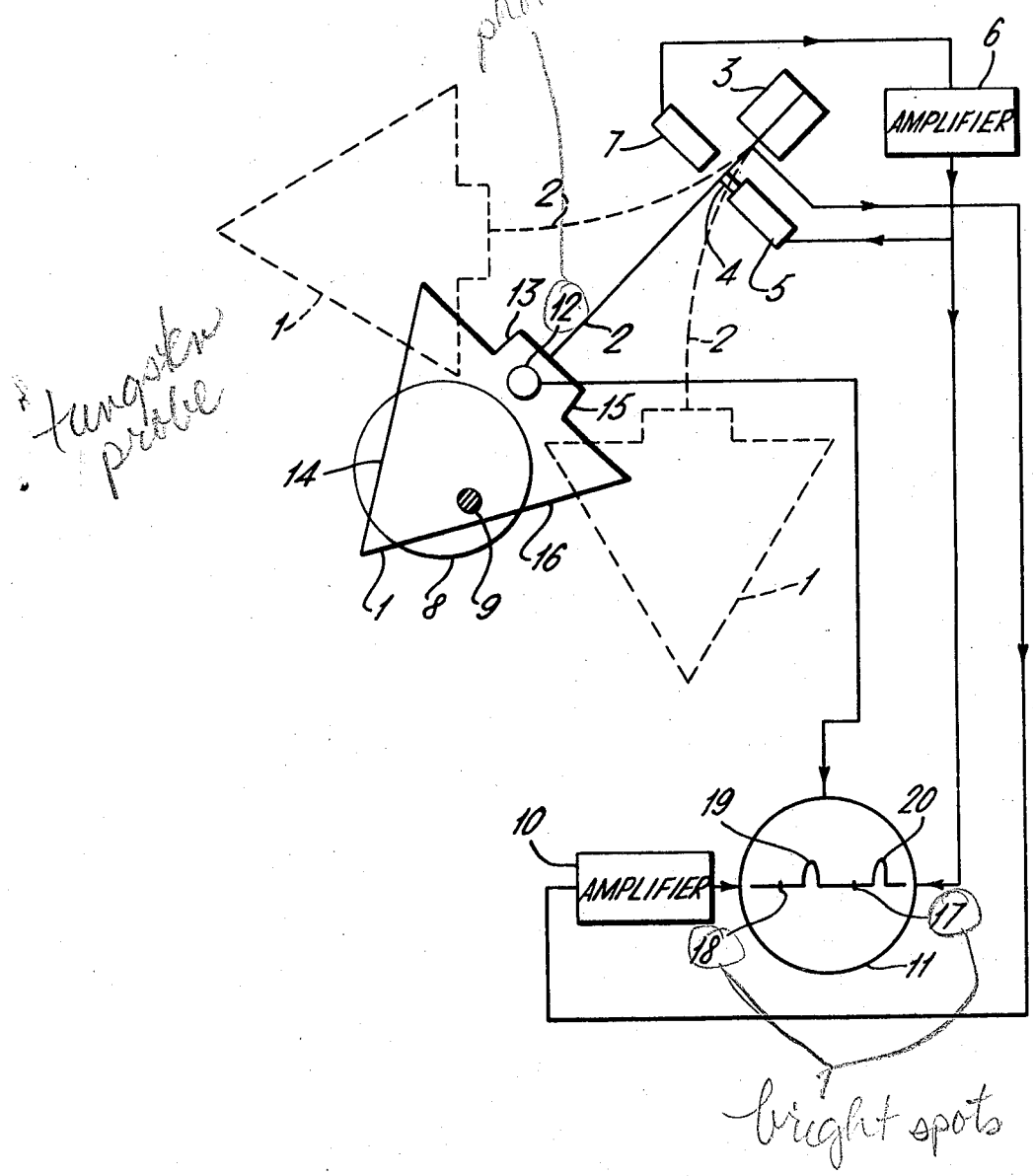

United States Patent Office 3,371,274
Patented Feb. 27, 1968

3,371,274
BEAM SCANNER FOR INDICATING THE POSITION OF A BEAM OF NUCLEAR PARTICLES
Cyril Norman Davey, Newbury, England, assignor to United Kingdom Atomic Energy Authority, London, England
Filed July 10, 1964, Ser. No. 381,845
Claims priority, application Great Britain, July 19, 1963, 28,791/63
2 Claims. (Cl. 324—71)

This invention relates to beam scanners.

By a "beam scanner" is meant a device for determining the position of a beam of nuclear particles. A beam scanner may, for example, be used when setting up or focussing a particle accelerator, when it is desired to know the position of the beam relative to the walls of a beam tube.

A beam scanner is described in "Nuclear Instruments and Methods" 14 (1961), pages 79 to 82. In that scanner two oscillating probes, each formed by a short length of tungsten wire, project into the beam tube. The beam gives rise to currents in the probes and these currents are separately amplified and supplied to a dual trace oscilloscope.

It is an object of the present invention to provide a simplified and improved beam scanner.

According to the present invention, a beam scanner comprises a single probe arranged to oscillate through the beam, means to derive a current from the probe the magnitude of the current varying in dependence upon the position of the probe relative to the beam, and means to display variations in the magnitude of the current visually, the probe being a conductor bent to substantially triangular, planar, shape and the arrangement being such that the display shows the position of the beam relative to two directions at right angles.

Preferably the variations in the magnitude of the current are displayed as a trace on an oscilloscope. Provision may be made for indicating on the trace the desired position of the beam relative to said two directions.

A beam scanner in accordance with the present invention will now be described by way of example with reference to the accompanying drawing, which shows the arrangement of the beam scanner very largely in schematic form.

Basically, the beam scanner comprises a tungsten probe 1 which is secured to one end of a flexible arm 2, the other end of which is held in a support 3. The probe 1 is formed by a wire bent to a substantially triangular, planar, shape, the side of the triangle nearest to the arm 2 being further shaped for a purpose which will be clear later.

Attached to the arm 2 is an armature 4 which is attracted by a coil 5 when the coil 5 is energised by an amplifier 6. The signal supplied by the amplifier 6 is controlled by a piezo-electric crystal 7 placed adjacent to the arm 2, so that a self-oscillating loop operating at a frequency of approximately 8 cycles per second is formed. In operation, the arm 2, and hence the probe 1, oscillates at this frequency, the extreme positions of the probe 1 being indicated by the dotted outlines in the drawing.

When in the rest position, the probe 1 is in the symmetrical position relative to a beam tube 8, down which a beam 9 to be investigated is passing. In the drawing the beam 9 is indicated as being away from the desired central position in the tube 8.

The probe 1 and the arm 2 are electrically connected to one another, but are insulated from the support 3. A connection extends from the arm 2 to an amplifier 10, the output of which is supplied to an oscilloscope 11 to control the Y-deflection. The X-deflection is controlled by a signal derived from the amplifier 6, so that the time base of the trace is synchronised with oscillations of the probe 1.

The beam scanner also includes a photo-cell 12 which is situated on the line joining the support 3 to the axis of the tube 8. Associated with the photo-cell 12 is a lamp (not shown). The lamp is positioned so that light from it normally falls on the photo-cell 12, but is momentarily cut off by the part 13 of the probe 1 at the instant the part 14 of the probe 1 passes through the axis of the tube 8, and by the part 15 of the probe 1 as the part 16 of the probe 1 passes through the axis of the tube 8. At these instants the photo-cell 12 supplies a signal to the cathode of the oscilloscope 11, each such signal giving rise to a bright spot in the trace.

The operation is then as follows. Ignoring for the moment the presence of the beam 9, as the probe 1 oscillates the photo-cell 12 will supply to the oscilloscope 11 four signals per cycle, these signals giving rise to the bright spots 17 and 18 which mark the centre of the tube 8 in the horizontal and vertical directions respectively. In addition, the beam 9 will give rise to a current in the probe 1, the magnitude of this current varying as first the part 14 and then the part 16 of the probe 1 approaches, passes through, and recedes from the beam 9.

The current in the probe 1 will be a maximum as the part 14 passes through the centre of the beam 9, and this will give rise to a deflection 19 of the trace. The parts 14 and 16 of the probe 1 are arranged so that they are vertical and horizontal respectively as they pass through the axis of the tube 8. This means that the deflections 19 and 20 would coincide with the bright spots 17 and 18, respectively, if the beam 9 were central in both the horizontal and vertical directions, and the extent to which the deflections 19 and 20 diverge from the bright spots 17 and 18 is proportional to the horizontal and vertical distances, respectively, that the beam 9 is from the central position.

The beam scanner may be used merely in setting up or focussing the beam 9, or may be used continuously to monitor the position of the beam 9. The interference which the probe 1 causes to the beam 9 when it is oscillating is quite slight. In the rest position the probe 1 does not interfere with the beam 9 if the beam 9 is central.

I claim:
1. A beam scanner for indicating the position of a beam of nuclear particles, comprising a probe arranged to oscillate through the beam, said probe comprising a single conductor having two coplanar conducting portions both of which pass through the desired position of the beam as the probe oscillates, said conducting portions in passing the desired position of the beam being generally parallel to two directions at right angles respectively, means to cause the probe to oscillate through the desired position of the beam, a single amplifier channel connected to the probe wherein current derived from said probe is amplified, and a single trace oscilloscope connected with the amplifier channel whereon variations in the magnitude of the amplified current are displayed visually to show the position of the beam relative to said two directions.

2. A beam scanner in accordance with claim 1 and further including two further portions on said probe, a light source and a light sensitive device which together with the probe are so arranged that said two further portions of the probe intercept the light passing from the source to the device as said two conducting portions respectively of the probe pass through the desired beam position, means connecting the light sensitive device and oscilloscope to supply signals thereto such that the trace of the oscilloscope is modified at the instants of interception and the desired beam position is thereby indicated on said trace.

References Cited

UNITED STATES PATENTS 3,152,238  10/1964  Anderson _____ 219—21
3,207,982  9/1965   Rose _____ 324—71

RALPH G. NILSON, *Primary Examiner.*

ARCHIE R. BORCHELT, *Examiner.*

A. L. BIRCH, *Assistant Examiner.*